United States Patent
Saponaro et al.

(10) Patent No.: US 11,539,530 B2
(45) Date of Patent: Dec. 27, 2022

(54) REMOTE BLOCKCHAIN MASTERNODE DEPLOYMENT

(71) Applicant: DIVI LABS AND TECHNOLOGIES SOCIEDAD ANONIMA, Escazu (CR)

(72) Inventors: Nicholas Saponaro, Spring Valley, CA (US); Geoffrey McCabe, Cobano (CR); German Luna Patiarroy, San Rafael (CR); Michael Greenwood, Seattle, WA (US)

(73) Assignee: DIVI LABS AND TECHNOLOGIES SOCIEDAD ANONIMA, San Rafael (CR)

( * ) Notice: Subject to any disclaimer, the term of this patent is extended or adjusted under 35 U.S.C. 154(b) by 245 days.

(21) Appl. No.: 17/035,666

(22) Filed: Sep. 28, 2020

(65) Prior Publication Data

US 2021/0099311 A1   Apr. 1, 2021

Related U.S. Application Data

(60) Provisional application No. 62/907,508, filed on Sep. 27, 2019.

(51) Int. Cl.
*H04L 9/32* (2006.01)
*H04L 9/08* (2006.01)

(52) U.S. Cl.
CPC ............ *H04L 9/3247* (2013.01); *H04L 9/088* (2013.01); *H04L 9/3236* (2013.01)

(58) Field of Classification Search
CPC ...... H04L 9/3247; H04L 9/088; H04L 9/3236
See application file for complete search history.

(56) References Cited

U.S. PATENT DOCUMENTS

| | | | | |
|---|---|---|---|---|
| 11,165,589 B2 * | 11/2021 | Jackson | ............ | G06Q 20/3829 |
| 2019/0173854 A1 * | 6/2019 | Beck | ...................... | H04L 63/123 |
| 2019/0305966 A1 * | 10/2019 | Qiu | .......................... | H04L 9/30 |

OTHER PUBLICATIONS

NPL (Can't get TXError: funding failed validity check! May 29, 2018, 7 pages) by 99darwin (Year: 2018).*
Npl (Mocci, Feb. 2, 2018, 7 pages) by DiVi (Year: 2018).*

* cited by examiner

*Primary Examiner* — Oleg Korsak
(74) *Attorney, Agent, or Firm* — Sanderson IP Law, Ltd.

(57) ABSTRACT

A remote blockchain masternode deployment system including a light client that can deploy a remote masternode without requiring the masternode owner to lose control of the funds staked at the masternode using a transaction identifier including a transaction hash and an index instead of a transfer of locked funds on the blockchain to an address controlled by a party other than the masternode owner. The masternode owner can unilaterally dismantle the masternode and recover the staked funds by spending the staked funds to another address controlled by the masternode operator. A pingless activation allows the masternode owner to "click and run" after funding the masternode without having to wait for the funding transaction to become buried before broadcasting an activation message. A staking vault performs staking functions for the owner in a way that does not allow unilateral spending of staked funds by the vault.

15 Claims, 9 Drawing Sheets

REMOTE BLOCKCHAIN MASTERNODE DEPLOYMENT

CROSS REFERENCE TO RELATED APPLICATIONS

This application is a Nonprovsional application claiming priority benefit to U.S. Provisional Application 62/907,508, entitled "Remote Blockchain Masternode Deployment" and filed on Sep. 27, 2019, the contents of which are incorporated by reference herein.

BACKGROUND OF THE INVENTION

Blockchains are peer-to-peer networks that update a shared ledger according to consensus rules. Nodes on a network of the blockchain share pending transactions and valid block updates to the ledger such that participants in the network of the blockchain agree on the state of the shared ledger as it changes over time. Some blockchains reward so-called "masternodes" with special authority and/or privileges on the network of the blockchain and who are entitled to receive masternode rewards. The rewards may be in return for operating the node and locking up an amount of digital assets during the reward period. Some blockchains, depending on the consensus rules, only accept updates to the shared ledger validated by masternodes.

Configuring and deploying a masternode can be a complex process involving multiple steps. The masternode operator must supply computer hardware sufficiently powerful to validate pending transactions and updates to the shared ledger from other nodes. Network communication bandwidth must be supplied sufficient to handle incoming new blocks and transactions from other nodes, and outgoing portions of other peers seeking to assemble a copy of the shared ledger. In the case of a masternode, funds may need to be encumbered such that the consensus rules consider those funds to have been locked on the masternode and thus are unable for transfer or normal use on the blockchain. Most users are unable to provision the necessary resources needed to run a masternode and are unwilling to perform all the actions needed to encumber sufficient funds for masternode participation. Thus, blockchain networks with masternodes may tend towards centralization with only a limited number of participating masternodes enforcing the consensus rules. Blockchains without robust decentralization are thus more susceptible to attack and the funds stored thereon are not as safe in comparison to a more decentralized blockchain network.

Another concept present in blockchains is that of "staking." Staking may be a substitute for proof-of-work (also known as mining) which is a process in which nodes compete with each other to guess a nonce value that, when placed in the header of a candidate block, causes a hash digest of the header to meet a difficulty target. Over time, a blockchain may adjust its difficulty target up or down to account for increasing or decreasing overall network hash power such that correct nonces are guessed, on average, such that blocks are added to the blockchain at a desired rate. In the example of the bitcoin blockchain, the difficulty target resets periodically to a difficulty calibrated to produce new blocks on average once every ten minutes.

A major disadvantage of proof-of-work mining is that it has the potential to consume massive amounts of electricity or other energy. Thus an alternative system for enforcing the consensus rules has been proposed, which is staking. In a staking blockchain, blocks are added by stakers who risk their coins when proposing new blocks. If a majority of peers believes a proposed block to be invalid under the consensus rules, the staker who proposed it can be "slashed," meaning the staked funds are lost. If a majority of peers believes the proposed block to satisfy the consensus rules, then the staker keeps the staked funds and receives a staking reward for protecting the chain.

Accordingly, there is a need for a deployment process for participants in a blockchain network with sufficient funds to activate a masternode to put the masternode into service and participate in blockchain staking even if the participants lack control of sufficient computing resources and are unwilling to take the typical steps to properly encumber the masternode funds and configure the masternode on the network of the blockchain.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
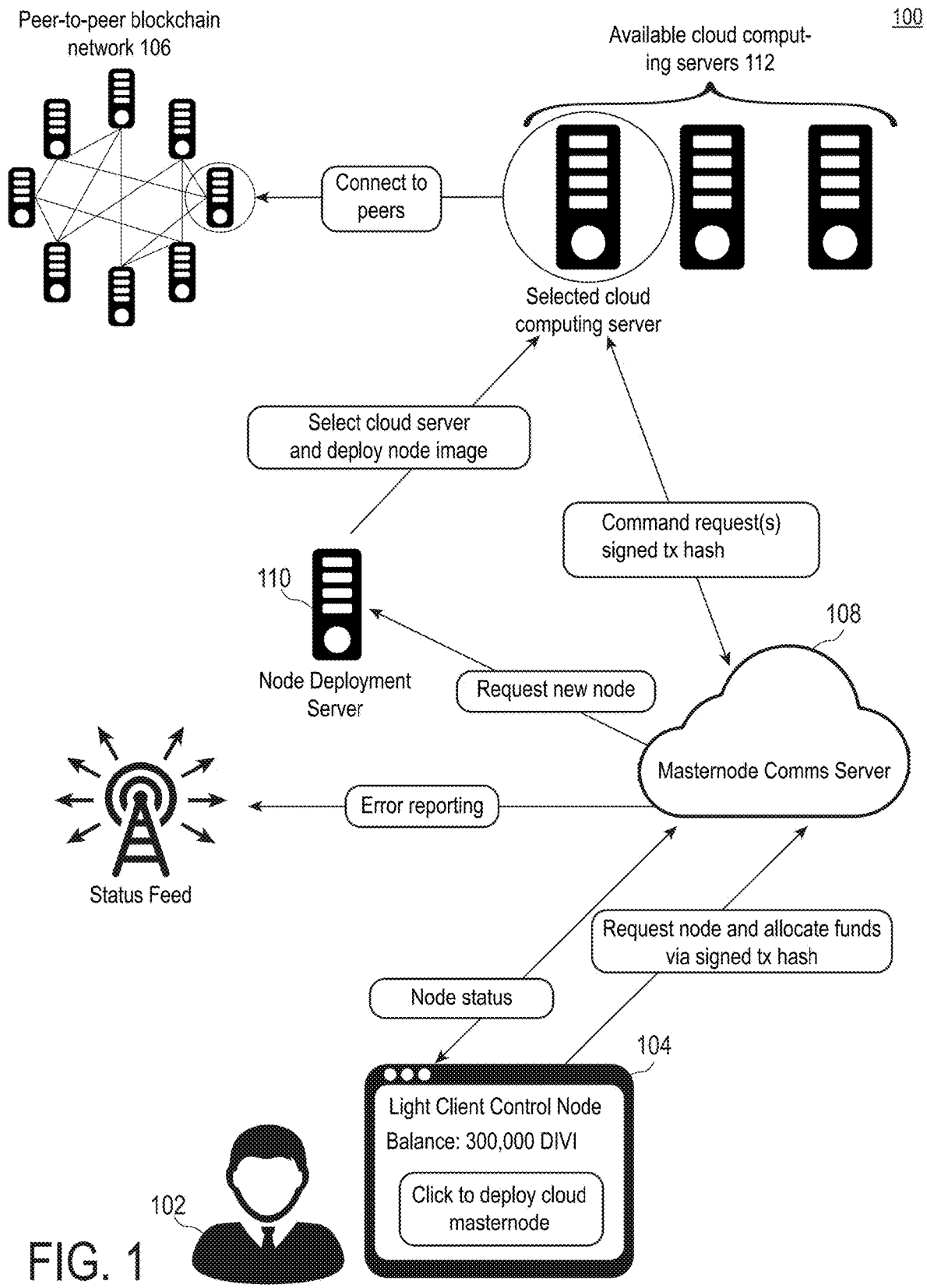
FIG. 1 is a diagram of an example cloud masternode deployment to a blockchain network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In view of the low participation ratio of users of a cryptocurrency to users who support the network by operating masternodes, an easier, more convenient way for more users to support the network with masternodes is needed. One reason for low masternode participation rate is likely that many users who are interested in operating a masternode lack, or believe they lack, the technical skills needed to configure appropriate computer hardware and software to deploy a computer system that has the uptime, bandwidth, and processing resources needed to participate. Another reason for low masternode participation is lack of access to "always-on" computer systems that are not susceptible to downtime if electrical services is interrupted and that are always connected to the internet, and thus able to connect to peers on the network, through high bandwidth and backup internet connections to which the masternode can fail over if the primary internet connection is interrupted. Another reason is simply that tasks that require higher effort and that are more complicated are relatively less likely to be selected by people who are interested but busy with other things.

Disclosed herein is a "one-click" masternode deployment arrangement that has several advantages over other masternode deployment systems. The one-click arrangement does include the use of cloud-based servers to perform some of the operations. Normally, cloud-based servers are disfavored in cryptocurrency systems, because they can be viewed as not significantly increasing the true decentralization of the network, but also because whenever spending keys are transferred to a remote computer, there is the risk those keys will be stolen or lost and the cryptocurrency user's funds will become unrecoverable. It is thus considered good spending key hygiene to never expose the keys to a system the user does not control. Systems exist solely for the purpose of signing blockchain transactions with spending keys that are never allowed to leave the device for this reason. If a cryptocurrency user generates wallet keys using a source of sufficient entropy, and the keys are never leaked or shared, then the cryptocurrency user can have a very high degree of confidence that the funds stored in the wallet are safe and will be available for spending when desired due to the vast size of the address space for cryptocurrency addresses.

The current arrangement is different from other cloud-based cryptocurrency node systems because the spending keys never leave the device of the end-user, who is in this case also a masternode operator. In other words, the funds locked up by the masternode operator to register the masternode on the system are not at risk due to leaking from any of the cloud servers. Instead, the masternode spending keys remain on the owner's "light" client, which is a type of node that may not be a "full" node in the sense that it may lack certain features (e.g., a full copy of the blockchain, storing and sharing with other peers copies of unconfirmed transactions known as the "mempool," maintaining persistent peer connections, or other features). The light client may perform some but not all functions of a "full" node. The light client control node 104 may run on a computing platform that lacks the computing and network resources to fully participate in the peer to peer blockchain network 106. For example, the light client control node 104 may lack sufficient disk space to store a full copy of the shared ledger of the blockchain maintained by the peer to peer blockchain network 106. The light client control node 104 may not include sufficient processing power and memory to validate transactions on the peer to peer blockchain network 106. The light client control node may not have adequate uptime or network bandwidth to participate, etc. These limitations in computing and network resources are not uncommon for users who wish to interact with a blockchain network. Thus, the term "light" is applied to the client to indicate less than full participation in storing, validating, and sharing the blockchain with the peers.

In this arrangement, the light client can register the locked up funds with the network, thus achieving recognition as a masternode as explained later herein, by making a transaction to an address that is approved by the network but without ever sharing the spending keys. Other components of the blockchain architecture disclosed herein, including cloud servers, carry out the functions of a "full" node including maintaining a high degree of network uptime and connections to peers, sharing of pending valid transactions and new blocks, uploading blockchain history to peers who are new to the network, etc. The light client is relieved of the burdens of running a full node but can still receive benefits of masternode ownership. Moreover, the one-click nature of the deployment incentivizes masternode ownership, which is beneficial to the owners and the network as a whole because greater decentralization of masternodes improves the security of the chain.

FIG. 1 is a diagram 100 of an example remote masternode deployment to a blockchain network in accordance with some embodiments. A masternode owner 102 runs a light client control node 104. The light client 104 may, for example, provide the masternode owner 102 with a wallet for sending and receiving funds on the blockchain 106. The light client may still validate the chain to an extent, such as by checking only the headers of blocks, and not the body of the blocks. "Checking" the headers in this context may refer to computing a hash of the headers to verify that the header meets a difficulty target and is thus properly included in the chain according to the consensus rules, but not verifying every transaction. Such a light client may act as an SPV (simplified payment verification) wallet which can check whether proof-of-payments sending funds to the masternode owner 102 are included in the chain without fully validating the chain if the light client has access to chain headers. A deterministically generated series of payment addresses can be checked against the block headers using a a Merkle tree root in the block headers to determine whether the proof-of-payment is included in the chain.

In the example illustrated in FIG. 1, the peer to peer blockchain network 106 applies consensus rules including masternodes. A masternode, as the term is used herein, includes a network node with special privileges and authority compared to the other nodes on the network of the blockchain. For a node to function as a masternode, the node locks funds. Locking funds means the masternode encumbers the funds so as to prevent those funds from being spent to another wallet in the normal manner.

FIG. 1 illustrates a deployment of a new masternode to a peer-to-peer blockchain network in accordance with the present disclosure. The light client control node 104 presents the masternode owner 102 an option to deploy a remote masternode using funds in the light client wallet. In some implementations, deploying the cloud masternode includes clicking a single button on the light client control node 104. When the masternode owner 102 deploys the cloud masternode, the light client control node 104 makes a request to a masternode communications server 108.

The masternode communications server 108 is a server not controlled by the masternode owner 102. The purpose of the masternode communications server 108 is to receive masternode provision requests from the masternode owner 102 and to facilitate the selection of a cloud server to perform the functions of a "full" node according to the instructions of the masternode owner 102.

The request to provision a new masternode includes an activation message signed by a private key of the wallet of the light client control node 104. The signed transaction hash commits funds without being confirmed on the network of the blockchain 108. In this arrangement, the light client control node is not disclosing its private spending key with which it signed the transaction hash, but rather transmitting the hash only to the masternode communications server 108. Thus, if the user 102 chooses in the future to take back the masternode funds, he can do so by broadcasting another transaction to the peer to peer blockchain network 106 moving the funds to a different address.

When the masternode communications server 108 receives the request for a new masternode and signed transaction hash, it requests the node deployment server 110 provision adequate resources for the new masternode. The node deployment server may select a cloud computing server from a group of available cloud computing servers 112. Several strategies are available for the node deployment server 110 to select a cloud computing server for the new masternode. In one implementation, the node deployment server 110 uses a round-robin strategy where the available cloud computing servers 112 are organized into a list and each new request for a new masternode goes to the next server on the list. This strategy may be useful for improving decentralization of the masternodes on the network of the blockchain 106, especially if many users choose to deploy a cloud masternode. In other implementations, the droplet deployment server 110 may select a server with the lowest network latency from the group of available cloud computing servers 112. In other implementations, the node deployment server 110 may select a server with favorable (or the highest) uptime out of the group of available servers 112. In yet other implementations, the node deployment server 110 may select a cloud computing server for balance among service providers with respect to other cloud computing servers in use for masternodes on the blockchain network 106.

Once the node deployment server 110 has selected one of the cloud computing servers, it sends a node image to the selected server. The node image is a disk image that includes all necessary software to build a full node on the network of the blockchain 106. The node image may include a partial history of the blockchain shared ledger such that the new node need not download the entire blockchain from peers. After the image is running, the selected cloud computing server starts the node, such as via a script, which connects to peers on the network of the blockchain 106, and syncs to the tip of the chain. When the node is ready, the selected cloud computing server connects to the masternode communications server 108 to signal its readiness. The masternode communications server 108 identifies the requesting cloud computing server (e.g., by IP address) and supplies the signed transaction hash committing funds from the light client control node 104. The cloud computing server will thus qualify as a masternode on the network of the blockchain 106 and may begin participation on the network, accordingly, including earning masternode rewards after the new node has been approved as a masternode by the existing masternodes on the system.

As the selected cloud computing server participates as a masternode on the network of the blockchain 106, it may supply diagnostic and status information to the light client control node 104 via the masternode communications server 108. Thus, the light client control node 104 need not remain online to control the masternode, but rather can connect as desired and receive masternode status information supplied by the masternode communications server 108.

In some implementations, the masternode communications server 108 monitors the outcome of command requests from the selected cloud computing server for error conditions. Various types of error conditions may occur, such as, for example, the masternode could fall out of sync with the rest of the network, there could be a consensus failure on the blockchain, the blockchain could be 51% attacked thus causing a deep reorganization of the chain, the cloud computing server could run out of resources such as memory and/or disk space, network connectivity could be lost, and more. When one of these error conditions occurs, it is likely the user will want to know about the status. Since running a masternode involves committing what are usually a significant amount of funds, the masternode owner 102 is likely to want to be aware if anything happens that could endanger those funds.

As one example, there could be a disagreement among network nodes over what should be the consensus rules applied on the blockchain. If this happens, the masternode owner 102 may need to decide which set of consensus rules to follow and run masternode software that applies the consensus rules selected by the user. Awareness of such a disagreement and the need to potentially upgrade the node software should therefore be communicated quickly to the masternode owner 102. Other error conditions could interfere with the masternode's ability to collect the masternode rewards, which would be of a financial cost to the masternode owner 102 and as such would also be of immediate interest to the masternode owner 102. To provide these notifications to the masternode owner 102, the masternode communications server 108 may have error reporting capabilities. The error reporting capabilities of the masternode communication server 108 being based on a notification trigger can use various channels. Implementations include SMS, email, push notification, posting to a chat channel, posting to social media, updating a website, etc. when the masternode communication server 108 receives results of command requests that indicate the error condition has been met.

Figure 2:
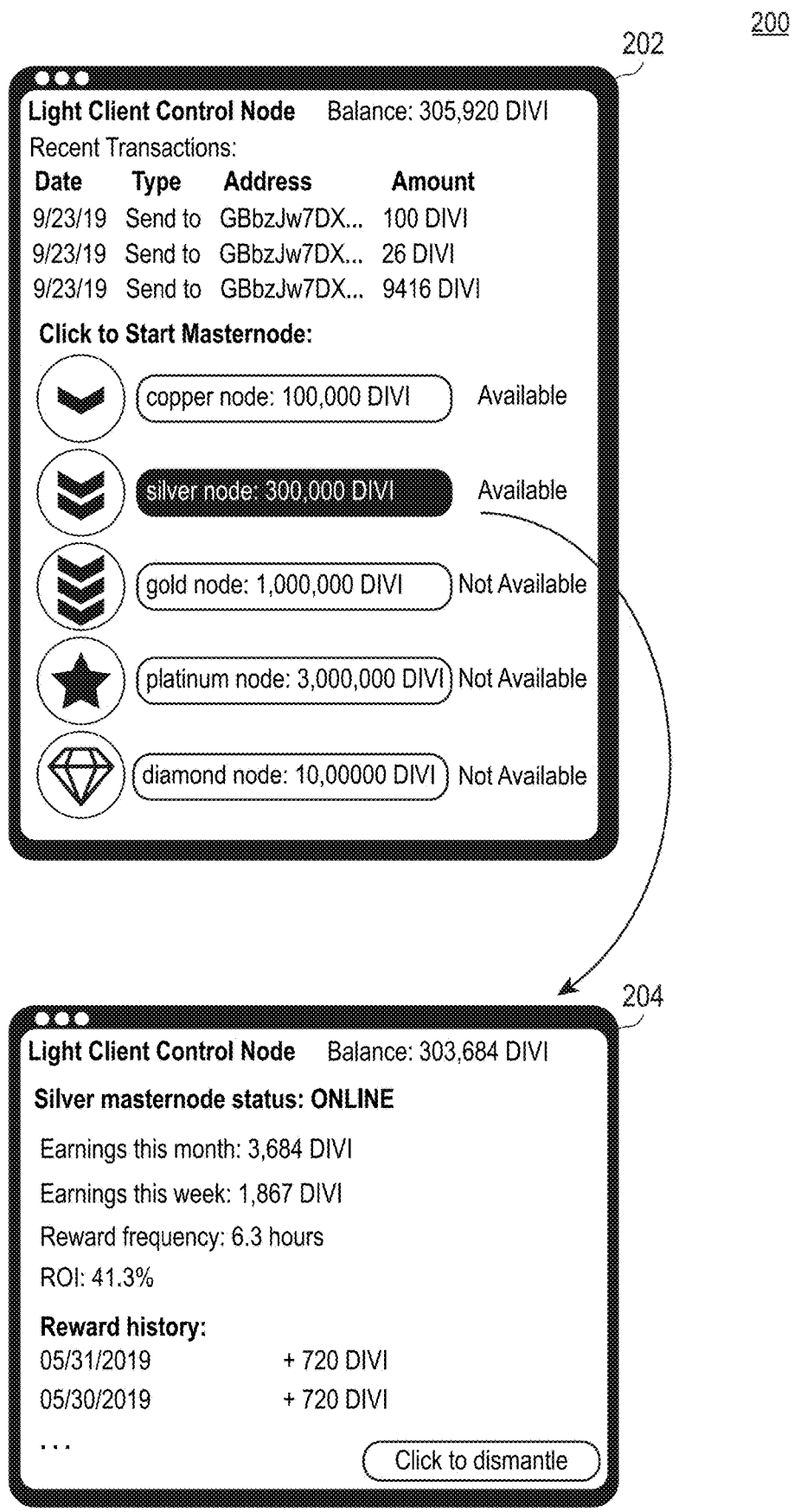
FIG. 2 is a diagram of a light client control node cloud masternode deployment to a blockchain network in accordance with some embodiments.

FIG. 2 is a diagram 200 of a light client control node cloud masternode deployment to a blockchain network in accordance with some embodiments. As described above, in many masternode arrangements, it is a requirement for the masternode operator to "lock up" blockchain digital asset funds in order to be recognized as a masternode on the network, to exercise masternode privileges, and to receive masternode rewards. The amount of funds required to be locked up is arbitrary but can reach substantial sums of money that most users do not possess. Often cryptocurrency users who would be otherwise inclined and able to operate a masternode cannot do so because of lack of access to the necessary funds. Many of these users are therefore likely to view operating and owning a masternode as being out of reach.

Disclosed herein is a novel masternode arrangement wherein masternodes can be provisioned by more than one level of locked masternode funds, separated into discrete tiers. Each tier may represent a different level of privileges on the blockchain, different levels of masternode rewards, different lockup period requirements, etc. In one arrangement, the ROI (return on investment) of the locked funds in percentage terms rises as the masternode operator moves up the tier ranking. Other requirements and privileges can be adjusted as one moves up and down the masternode tier ranking (e.g., uptime requirements, voting privileges on recognition of other masternodes, etc.).

Combined with the one-click nature of masternode deployment, this protocol makes masternode participation available to many owners who would not otherwise be able to deploy a masternode. Encouraging more masternode participation has beneficial effects on the network. More masternode participation means more users who might otherwise have participated in other blockchain networks. Increasing adoption is often cited as a goal of a public blockchain to increase network effects since the blockchain involves a digital asset currency which will be more useful the more people accept it in exchange for goods and services. Increasing the number of masternode owners improves security of the blockchain network because there is reduced reliance on "single point of failure" nodes that, if compromised, could support an attack on the network.

Since masternodes involve an ownership stake in the health and future success of a blockchain, increasing the number of masternode owners increases the number of "custodians" of the network who are likely to be involved in the social layer of blockchain governance when the time comes to make hard decisions about which consensus rules should be applied. A strong community with a variety of viewpoints has been cited as a strength of certain blockchains (e.g., ethereum) compared to the so-called "ghostchains" that are mostly or completely controlled by a single entity or small group of colluders (e.g., a chain wherein a single corporation or organization owns all or almost all masternodes).

When an owner of the light client receives funds sufficient to support a masternode, a one-click user interface may be presented to the user to launch provisioning and activation of the cloud based masternode. Launching of the masternode can be accomplished in a single click here, but normally establishing and funding a functioning masternode is a process requiring substantial configuration of the node over a large number of steps. Simply getting a node connected to peers and accepting inbound connections from peers is a technical hurdle too high for most users (thus the popularity of the light client), let alone a funded masternode earning masternode rewards for the user. The tasks needed to successfully launch the masternode here are handled by a suite of scripts and software to accomplish the results described herein.

In an implementation illustrated in FIG. 2, there are five tiers of masternodes, each tier requiring an increasing amount of funds to be locked to qualify for the tier. In the example illustrated in FIG. 2, the blockchain digital asset is called DIVI and to advance to the next highest tier, a masternode owner would have to lock up increasing amounts of DIVI. The escalating tiers may offer economic incentives to induce the network participants to lock up larger amounts of funds, thus improving security and management of the blockchain network. One type of economic incentives may be a larger masternode reward, such as a larger percentage of the amount of funds locked. Other arrangements could involve escalating blockchain privileges (e.g., voting power on approval of new masternodes, etc.) that are not strictly payment-based rewards.

The screen 202 shows information relating to the light client wallet common to wallets including overall balance and transaction record. The transaction record may include datestamps, type of transaction, address the wallet sent the transaction to or received the transaction from, and the amount of the transaction in units of the blockchain digital asset.

In the screen 202, a masternode owner has selected to launch a silver tier masternode by committing 300,000 units of DIVI funds on the blockchain. Upon the single-click command to launch the masternode on the silver button, the light client presents user interface 204 to the masternode owner. In one step, the masternode owner moves from a light client wallet showing transactions and providing send and receive capabilities to a masternode control screen showing operation of the cloud based masternode. This arrangement is likely to be very attractive to the user compared to other ways of launching a masternode wherein multiple pieces of information must be entered by the user.

One major drawback of other cloud-based node deployment systems is that the user is required to send funds away from the light client to another wallet. If the user ever signs away the funds held in the wallet, there is the possibility that those funds may never return to the control of the user. Only if the user's wallet holds the only copy of a private key that is not held by any other network participant can the user be sure that the funds are secure. Revealing the spending key or signing a transaction with the spending key moving the staked funds to another wallet are an enormous risk to the security of the funds. In the present tiered masternode deployment system, on the other hand, only a transaction identifier and a management private key are sent away from the light client and not an actual transfer of funds or transfer of a key that could be used to spend funds.

As used herein, a transaction identifier means a hash of a signed blockchain transaction and an index. A hash of a blockchain transaction means the digest output of a blockchain transaction signed by a spending key of the light client wallet. The management private key does not control any funds in the light client wallet. Instead of being used for spending funds, the light client uses the management key to conduct operations on the network such as signing an activation message, identifying itself to other nodes and other masternodes, etc. In one implementation, the management key is derived based on the same entropy source as the set of public and private keys used to handle wallet operations that move funds but does not intersect with the funds-handling keys. One way to make the management key not intersect with the spending keys is to use different derivation paths for deterministically generating the pairs of public and private keys. Thus to generate a management key, it is not necessary for the wallet to have access to another source of entropy other than the source of entropy used to initially generate the wallet. Derivation paths may be chosen, for example, from the types of derivation paths disclosed in Bitcoin Improvement Proposal 39 (BIP-39). If the management key comes from a different derivation path from the set of keys used to spend and receive funds, then there is no risk of loss of funds if the management private key becomes compromised, as it might if it is communicated to another system from the light client.

The locked masternode funds here can thus be deemed encumbered by the cloud masternode for purposes of network participation and collection of masternode rewards, but the user can still dismantle the masternode unilaterally at any time by broadcasting a transaction signed by the light client spending the locked funds to another address controlled by the light client and not locked at the masternode. The masternode owner thus does not depend on continued participation of other components of the system controlled by third parties such that the termination of the third party's participation could lead to loss of the funds locked by the user as would be the case in a more centralized architecture.

Upon launching the masternode with the single click, the status of the masternode is shown in screen 204. Metrics such as masternode rewards earned over various time periods, analysis of the economic value of the masternode (e.g., ROI of staked funds), masternode reward history, and more, can be shown to the user. A dismantle button can be effective to spend the staked funds to an address controlled only by the light client wallet to end operation of the cloud based masternode.

Figure 3:
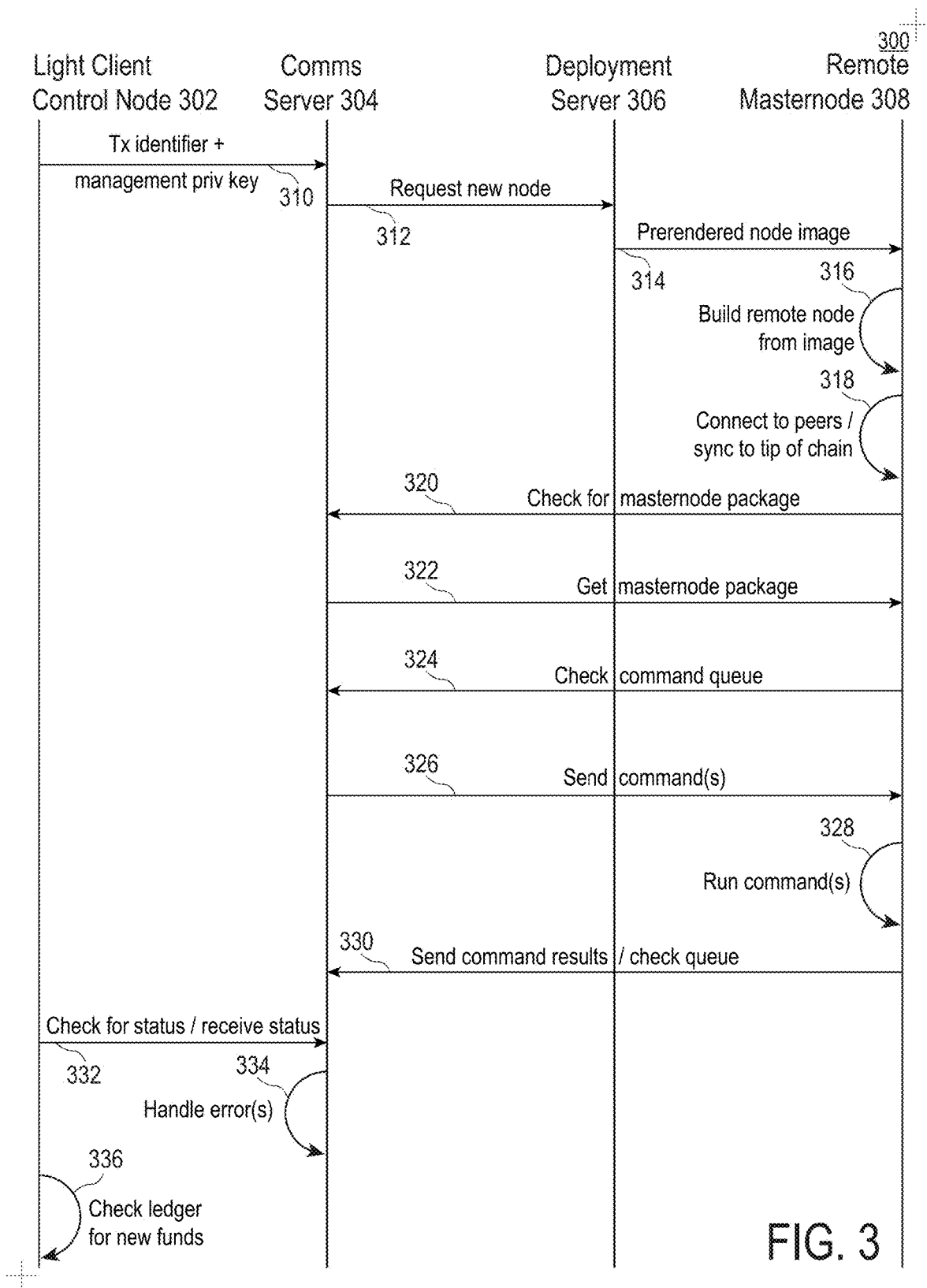
FIG. 3 is a signal diagram of interactions among a control node, a communications server, a deployment server, and a remote masternode in a blockchain network in accordance with some embodiments.

FIG. 3 is a signal diagram 300 of interactions among a light client control node 302, a communications server 304, a deployment server 306, and a remote tiered masternode 308 in a blockchain network in accordance with some embodiments. The light client control node 302 initiates the process at 310 by sending a transaction identifier and management private key to the communications server 304. The communications server 304 requests at 312 to provision a new masternode from a deployment server 306. The communications server 304 may validate the transaction identifier before requesting the deployment server 306 for a new masternode.

The deployment server 306 may be pre-loaded with image snapshots of a masternode configured to participate in the blockchain network, such as a synced or partially-synced masternode. Upon provisioning of the image to the remote masternode cloud server 308 at 314, the remote node cloud server 308 builds the masternode from the image at 316 and runs scripts and programs needed to configure the instance of the remote node and/or the node itself to be suitable for operation as a masternode. After the scripts execute, the masternode should connect to peers, sync to the tip of the chain at 318, validating the chain as it is received, and sharing the pool of pending transactions with other peers. The image may include part of the shared ledger history such that the new instance of the masternode need not burden the other peers unnecessarily by requesting blocks from the entire history of the chain.

After the remote masternode 308 is connected to the network and synced, it can report to the communications server 304 at 320 to receive the masternode package including the transaction identifier and other configuration information at 322. Upon configuration, the remote masternode 308 may check a command queue from the communications server 304 at 324 for further instructions on masternode operation and configuration. If there are commands in the queue, the remote masternode 308 can receive the commands at 326, execute those commands at 328, and revert results to the communications server 304 at 330.

The communications server 304 may process and distribute information received from the remote masternode 308 such as responding to error conditions at 334 in an effort to remediate, notifications of the user of the error and/or other status conditions, etc at 332. Masternode rewards are handled by the user's light client checking for addresses it controls at 336 (e.g., the deterministic set of addresses generated by a seed phrase) to enable the user to access funds including the masternode rewards earned by the remote node.

Figure 4:
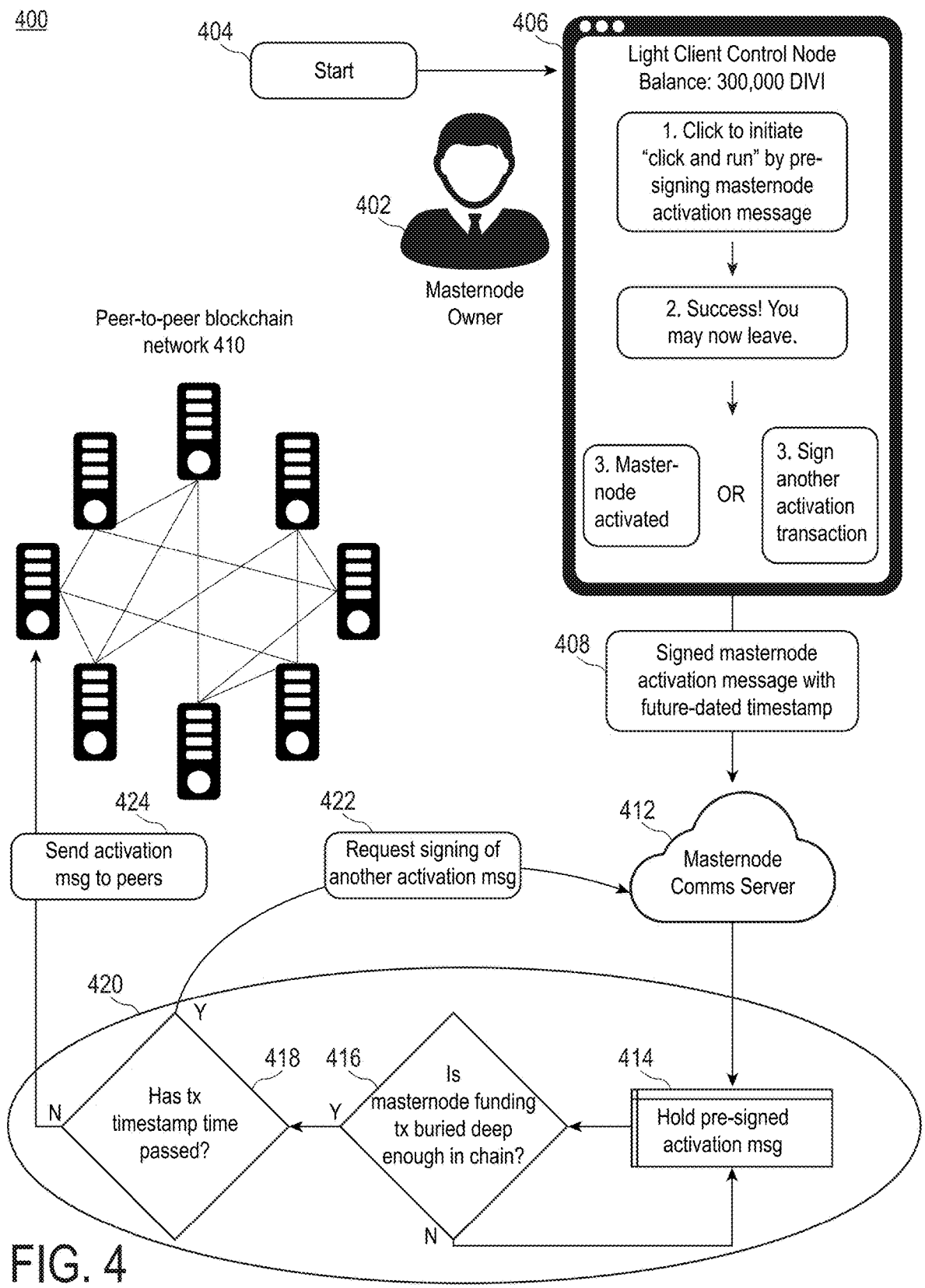
FIG. 4 is a diagram of a pingless feature for new masternode setup in accordance with some embodiments.

FIG. 4 is a diagram of a pingless feature for new masternode setup in accordance with some embodiments. The "pingless" feature is an important aspect of the remote masternode deployment system disclosed herein because it permits the masternode owner to "click and run," thus making masternode deployment easier for the typical user. As stated above, increasing masternode participation on the network is desirable due to the benefits to security, decentralization, adoption, and more. Most users who have at least some interest in becoming masternode owners, however, do not ever actually deploy masternodes. Key to connecting with this population of interested but non-participating users is the concept of making masternode deployment as easy as possible.

One of the ways conventional masternodes are unduly inconvenient to the users is in blockchains where the consensus rules require an activation message to be signed by the masternode key and propagated to other nodes and/or masternodes, which must approve the new masternode. Until a newly deployed masternode is so approved, masternode rewards will not be earned by the new node. Thus a newly deployed masternode can be seen as sitting idle in terms of masternode rewards until the activation message has been approved by the network.

For clarification, the locking transaction is a true blockchain transaction signed by the spending keys of the light client control node that moves blockchain digital asset funds and is confirmed according to the consensus rules to the blockchain. If such a transaction is signed by a wallet and propagated to the peer-to-peer nodes of the network, those nodes will reach consensus that the transaction is valid and include the transaction in a block which represents an update to the shared ledger, which in this case is a transfer of coins from one wallet to another.

The activation message, on the other hand, is not a signed blockchain transaction but a signed message that is not confirmed to the chain. The activation message is simply a message that announces the availability of the newly deployed masternode and references the locking transaction (e.g., by transaction identifier). The activation message is not signed by a private key in the same derivation path as the keys used to spend and receive funds from the light client control node wallet. Instead, the masternode private key is a key generated using a different derivation path from the spending keys and thus will be at most a signing key for authentication and not a spending key of real funds. The set of spending keys and masternode keys can be derived from the same entropy source and can share a restore seed phrase.

In a conventional masternode deployment scenario to a blockchain with an activation message consensus rule, the activation message chronologically follows the earlier locking transaction and cannot be propagated until the locking transaction is confirmed to the chain. In some implementations, the consensus rules do not permit an activation message to be sent immediately after the masternode is funded by the confirming locking transaction. Instead, the masternode funds must remain locked for a period of time to ensure that the masternode funding transaction has been properly confirmed to the blockchain and to prevent an attacker from initializing a masternode and then immediately attempting to double-spend the staked funds and collect a masternode reward without actually locking up the funds, as is required by the protocol.

One way of viewing the waiting requirement is to ensure that the funding transaction becomes "buried" deep enough in the chain. By "buried" in this disclosure, it is meant that the locking transaction is confirmed to the blockchain, then a number of subsequent blocks are mined or otherwise generated on top of the block with the locking transaction. Since a blockchain is a chain of digital signatures, the deeper a transaction is buried, the less likely it is to ever be reversed because reversing it would mean re-doing all the computation of the subsequent blocks or re-doing the staking process that confirmed the subsequent blocks. Such an operation becomes computationally impractical as the number of subsequent blocks grows. Thus, the deeper a transaction is buried, the more confident the network participants can be that it will not be reversed or that the majority of peers on the network will not "re-org" to a longer chain, following the general rule that the longest or heaviest version of the chain is the correct version of the chain.

A consensus rule requiring the funding transaction to be buried to a certain depth before a new masternode activation message can be sent to the network is good for network security but bad for usability because the masternode owner is forced to choose between waiting idly and watching the clock for the funding transaction to be confirmed and then buried in the chain to the appropriate depth or else walking away and leaving the masternode rewards on the table until a later time when the masternode owner can return and send the activation message. What is missing is a "click and run" arrangement wherein the masternode owner can deploy a new masternode, send the funding transaction, and then send an activation message at substantially the same time that will be accepted by a blockchain network without waiting for the funding transaction to itself be confirmed and buried to the minimum depth in the chain. It is likely that without such a solution, some of the masternode owners will abort the process and never complete activation of the new masternode and thus lose out on their masternode rewards, which is a usability experience that will deter new masternode owners from joining the network.

The "pingless" masternode feature disclosed herein is an improvement to existing masternode initialization and activation procedures because it frees the masternode owner from having to wait until enough blocks have been added to the chain before sending the activation ping. The masternode deployment architecture disclosed herein leverages the cloud masternode communications server to perform certain intermediary functions between the light client control node and the cloud full node on the network. The cloud masternode communications server can assist in the creation and management of masternode authentication messages and other masternode messages signed by the light control client. Due to this novel arrangement, the masternode owner may pre-sign the activation message at the same time as she signs the masternode funding transaction, and leave the signed message in the custody of the cloud masternode communications server. When the staking transaction is sufficiently buried in the chain, the cloud masternode communications server can transmit the signed activation message to at least one peer such that it is eventually propagated to all peers and/or masternodes. If the activation message is accepted, it will lead to activation of the new masternode without any continued participation from the masternode owner. This arrangement is referred to herein as a "click and run" masternode initialization because the masternode owner can sign the activation message at or very shortly after the masternode funding transaction is sent, and even before it has confirmed to the chain, and then disengage with the process because the masternode communications server will hold the signed activation message on the masternode owner's behalf and monitor the status of the chain to determine when the signed activation message is ripe for broadcasting.

There is a potentially problematic aspect of the masternode communications server holding the signed activation message on behalf of the masternode owner and the light client control node depending on the implementation of the consensus rules of the blockchain network that the new masternode wishes to join. If the consensus rules require a minimum number of blocks to be mined after the funding transaction confirms, and the consensus rules also require that the signed authentication message have a timestamp that is a minimum distance from the timestamp of the block that mined the funding transaction (e.g., the signed activation message must be at least 50 blocks after the block that confirmed the masternode funding transaction and the signed activation message must be timestamped at least two hours after the timestamp of the block that confirmed the funding transaction), then the issue relating to holding the pre-signed message on behalf of the light client can arise.

The issue can be described as follows: when creating the pre-signed activation message, the light client must guess how far into the future to timestamp the message because it is not possible to know how frequently blocks will be mined due to the probabilistic variation in new block times. If the light client guesses a timestamp that is too early, then a sufficient amount of time will not have passed from the timestamp of the block that mines the funding transaction and the activation message will be invalid. If the light client guesses a timestamp for the pre-signed activation transaction that is too far in the future, then the activation message will not become ripe as soon as it would have if the timestamp had been earlier and the masternode owner could miss out on masternode rewards that would have been available had the activation message had an earlier timestamp.

The timestamp in the signed activation message is therefore guessed in a way that seeks to balance prompt activation with the risk that the activation message will be invalid when the time of the timestamp arrives. Since parameters such as total network hashrate, target mining difficulty, amount at stake, etc. can be known, it is possible to calculate a future timestamp that will prove to be valid at a known percentage of all new masternode deployments. There will always be a long tail of outcomes such that not all new masternode deployments will have a validly timestamped pre-signed activation message. In these cases, it will be necessary to go back to the masternode operator and request that the light client sign a new activation message with a later timestamp.

FIG. 4 illustrates the pingless activation message workflow. A masternode owner 402 begins the process at start block 404 and opens the light client control node 406. After selecting the desired masternode tier and making the funding transaction, the screen 406 of the light client control node shows the "click and run" option at step 1. If the masternode owner 402 clicks, the activation message is signed with the future-dated timestamp at 408 and the masternode owner is shown the message at step 2.

The masternode communications server 412 receives the signed activation message with the future-dated time stamp and engages in loop 420. The first step of loop 420 is simply holding the signed activation message at 414. The next step is decision point 416 which depends on whether the masternode funding transaction is mined and buried deep enough in the chain. Decision block 416 can include checking a block explorer or copy of the blockchain to determine whether the funding transaction has been mined (e.g., by checking the Merkle root) and, if so, what was the block height of the mined block and how deep is it from the current block. If the funding transaction is not buried deep enough, the workflow returns to 414. If the funding transaction is buried deep enough, the workflow moves to decision block 418. Decision block 418 determines whether the time stamp has passed. If the timestamp is not the past, the signed activation message is valid and is sent to at least one peer at 424. If the timestamp is in the past, the workflow requests signing of another authentication message at 422 to the masternode communications server 412.

Figure 5:
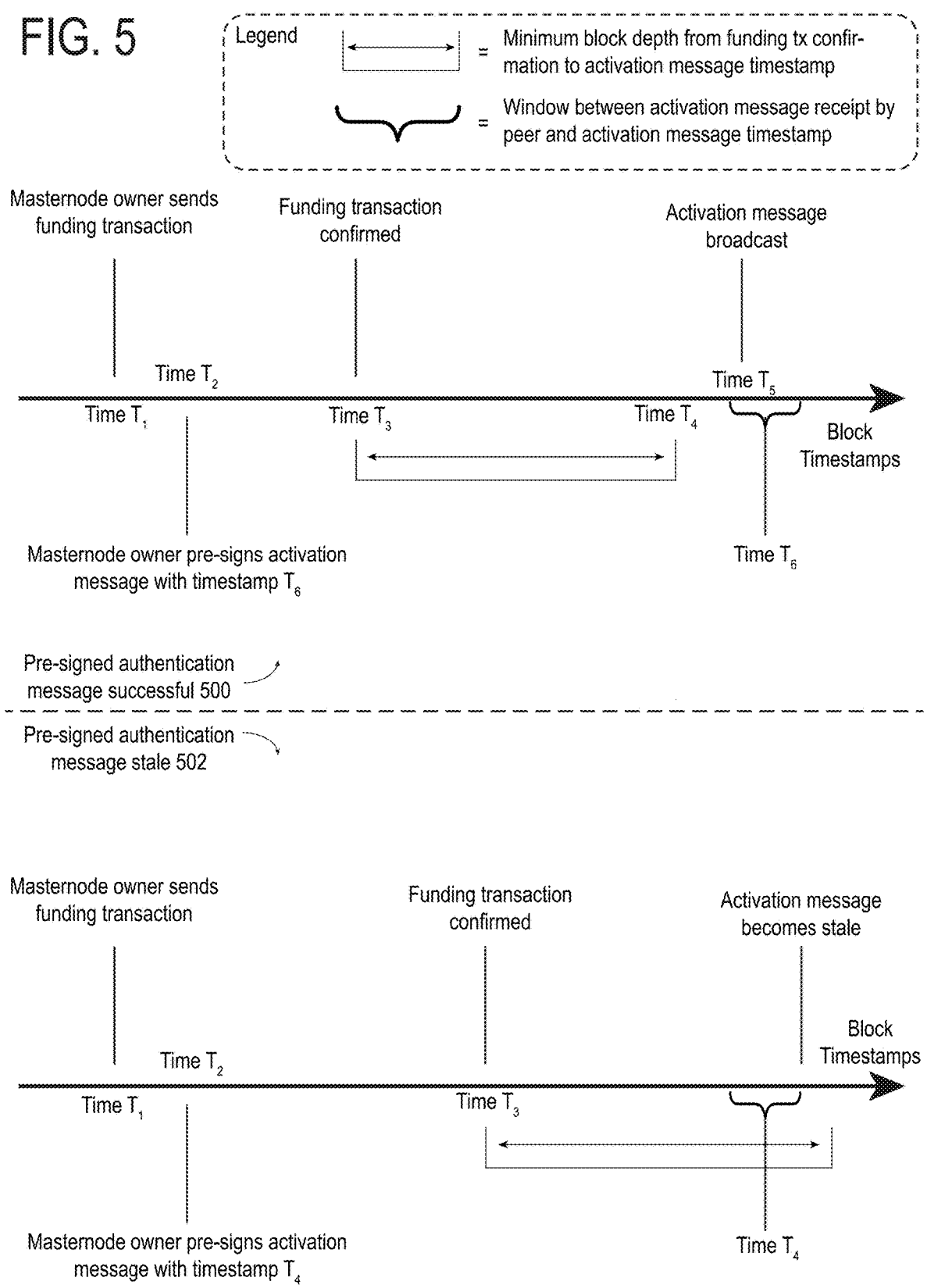
FIG. 5 includes two timeline diagrams of a successful pre-signed masternode activation message and an expired masternode activation message in accordance with some embodiments.

FIG. 5 includes two timeline diagrams of a successful pre-signed masternode activation message and an expired masternode activation message in accordance with some embodiments. A first timeline diagram in the area above the dashed line 500 shows an example chronological progression of a successful pingless masternode activation. By "successful" in this context, it is meant that the masternode has the "click and run" experience for the masternode owner. The masternode reward funds will start flowing as soon as the signed activation message is accepted by the peers and the masternode owner will not have to return to her terminal to sign a reward message a significant amount of time after signing the masternode funding transaction. The timeline below the dashed line in the area 502 illustrates an example timeline wherein the pingless feature does not work, the pre-signed activation message becomes stale before it can be accepted by the peers and the masternode owner must be asked to sign a second activation message before masternode rewards will begin to accrue, thus failing to deliver "click and run."

On the timeline in the area 500, the units of the timeline itself are in timestamps of consecutive blocks, not in blockheight. Timestamps of consecutive blocks should roughly follow clock time, allowing for drift of the local clocks of the stakers and/or miners who are proposed the accepted new blocks. In some cases, a consensus rule will limit the amount of drift between blocks that are acceptable to the network. The timeline begins at time T1, when the masternode owner signs the funding transaction to lock up funds sufficient to qualify for the desired masternode tier. Shortly after time T1, the masternode owner's light client control node will present a button to click for the masternode owner to sign the activation message with the masternode keys. In some implementations, the button could be skipped entirely, and the signing of the funding transaction and the signing of the activate message could be triggered by clicking a single button (e.g., "one-click masternode deployment").

In an implementation, the light client control node guesses the timestamp T6 that will be included in the signed activation message. Depending on various factors such as congestion of the blockchain (e.g., size of the mempool), the fee attached to the masternode funding transaction compared to the other pending transactions, the rate at which miners and/or stakers are solving new blocks, there will be a delay until the masternode funding transaction is confirmed. Confirmed here means included in a valid new block by a miner and/or a staker and shared among the peers who reach consensus that the block including the funding transaction should be included in the chain. The minimum time period after confirmation before the signed activation message can be accepted, shown in FIG. 5 as the double arrow will not start until the funding transaction is confirmed. Since the time of confirmation of the masternode funding transaction will not be known in advance, the light client control node and/or the masternode communications server can estimate time to confirmation based on the factors outlined above and add an additional safety margin. The larger the safety margin, the less likely the activation message will become stale, but the longer the masternode owner will have to wait to start collecting masternode rewards.

Once the valid funding transaction has been transmitted to the mempool and shared by the peers, and the signed activation message is in the hands of the masternode communications server, the masternode owner can leave the picture. The masternode communications server may monitor the blockchain, waiting until the funding transaction is confirmed. One way to easily check for when the funding transaction has been included is to check the merkle root of each block header. Another way is to check the body of the new blocks as they are solved for the transaction ID of the funding transaction. Once the funding transaction has been mined into the chain, a time period begins, which represents the minimum block depth that must be mined on top of the funding transaction before the signed activation message can be accepted by the network. If the funding transaction becomes buried under minimum block depth at time T4, which is before the timestamp T6, then the masternode communications server need only wait until the current time is within the window between activation message receipt by peers and activation message timestamp, which is shown in FIG. 5 with the curly brace. Once the window has been entered, the masternode communications server may broadcast the activation message at time T5 and the masternode will have joined the network under the "click and run" model.

The timeline in the area 502 is similar to the above-described timeline, except that the time T3 when the masternode funding transaction is confirmed is within the minimum block depth of the timestamp T4 on the pre-signed activation message. This means the curly brace around time T4 will expire before the minimum block depth is reached. In this case, the activation message will be deemed stale and would be rejected by the peers if it is used to try to activate the masternod. Thus, the masternode communication server must notify the light client control node, which will ask the user to sign another activation message. In some implementations, the masternode owner need not manually click a sign button, and instead the light client control node will automatically sign a second activation message with another future-dated timestamp, and this time the timestamp will be well outside the minimum block depth and will not run the risk of going stale. In other notifications, the masternode owner will manually sign the second activation message.

Figure 6:
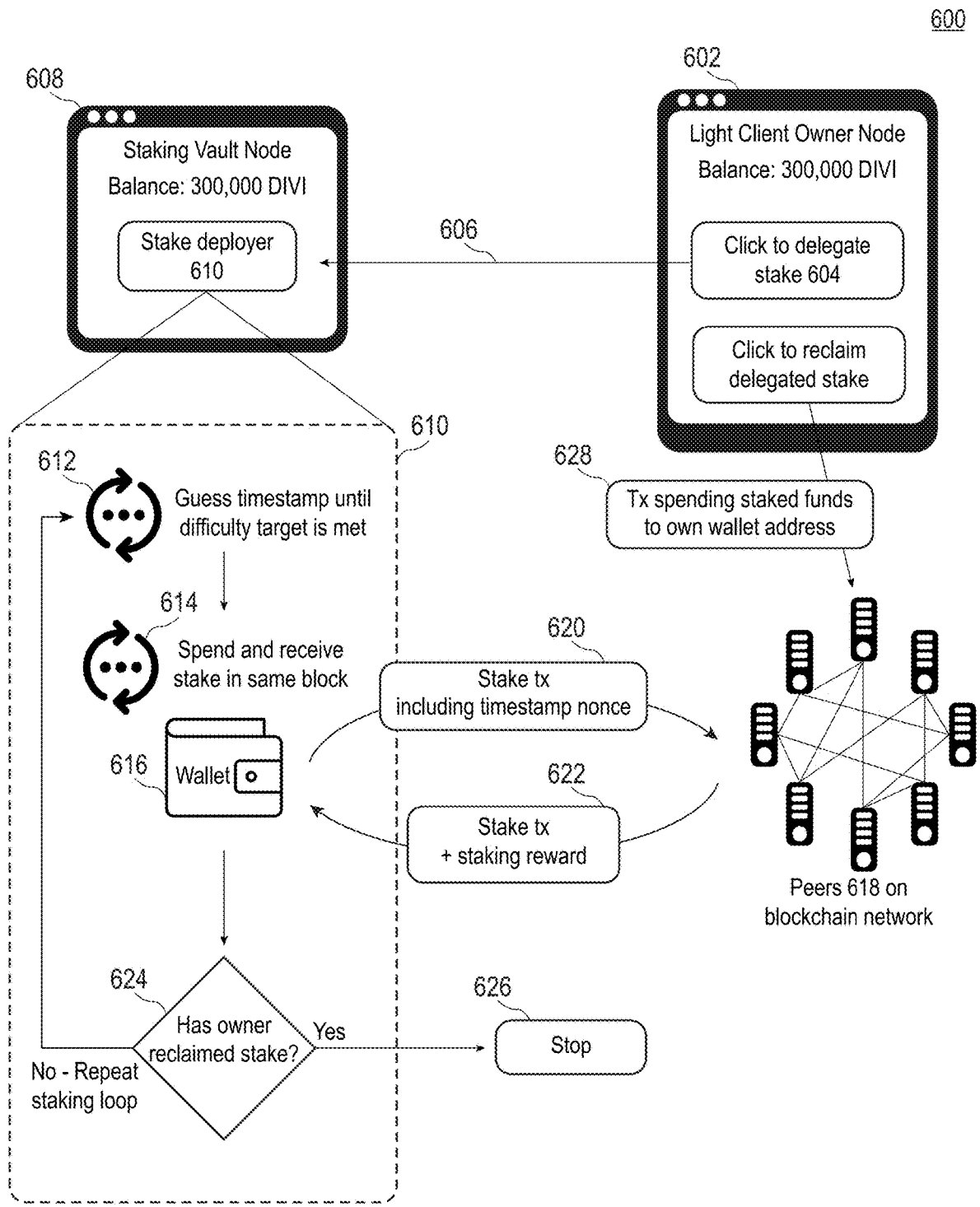
FIG. 6 is a diagram of an example staking vault arrangement in accordance with some embodiments.

FIG. 6 is a diagram 600 of an example staking vault arrangement in accordance with some embodiments. In some blockchains, the consensus mechanism for adding new blocks is a proof-of-work principle wherein "miners" compete with each other to guess a "nonce" value to include in a proposed new block header such that the hash digest output (e.g., a SHA256 hash) meets a difficulty target (e.g., the hash digest starts with a predetermined number of zeros). Since a hash digest is an unpredictable output, any change to the input will radically alter the output/digest. Accordingly, miners compete to guess nonces until someone gets lucky and guesses a nonce that meets the difficulty target. The reason for the competition is that the miner who guesses the correct nonce will collect newly minted coins from the new block plus transaction fees paid by the senders of transactions included in the block. Some blockchains, such as bitcoin, will periodically recalibrate the difficulty target such that, on average, one block is solved per unit time (e.g., once per every ten minutes on average for bitcoin).

Other blockchains work on a different consensus mechanism called proof-of-stake wherein "stakers" replace miners to produce new blocks. Instead of guessing nonces, the stakers risk blockchain funds as part of their proposing new blocks. If a majority of stakers disagree that a proposed block meets the consensus rules, then the stakers who proposed the block will get "slashed," meaning the funds at stake are lost. If a majority of stakers, on the other hand, agree that a proposed block is acceptable under the chain's consensus rules, then the staker who proposed the block will be rewarded. This mechanism should create an economic incentive for stakers to behave honestly because their funds will be lost if they do not.

Disclosed herein is a blockchain with consensus rules that are a hybrid of proof-of-work and proof-of-stake. Also disclosed herein is a "staking vault" arrangement that frees an individual staker from many of the burdens usually carried by stakers. A staker can be slashed for proposing a bad block but also for going offline. Staking rewards can be missed if a staker misses an opportunity to propose a new block and thus misses out on staking rewards and/or collecting transaction fees. To improve usability of the system for stakers, the staking vault arrangement requires only that a light client control node sign a transaction to create an encumbrance on the staked funds that can be satisfied with a signature from a third party, such as the vault operator, but without creating a transaction that the staking vault operation can unilaterally spend to an arbitrary address (e.g., steal the staking funds). One way to do this is to create a multisig encumbrance on a transaction or a transaction that can only have the staker's wallet address as the output.

In the example illustrated in FIG. 6, a light client control node 602 presents a one-click staking button 604 to the owner of the funds to be staked. Upon clicking, the light client control node 602 signs funds to the staking vault node 608. The staking vault node 608 includes a staking deployer 610 that is described in more detail with reference to box 610. The staking deployer 610 stakes the funds on behalf of the light client owner node 602 without involvement from the light client owner node 602. The staked funds can only be spent to the same UTXO (unspent transaction output) from which they originated, and cannot be spent to any other UTXO such as a UTXO controlled by the staking vault node 608 or any other participant in the system. The staked funds are thus entrusted to the staking vault in a way, but also unilateral control of the funds remains with the light client owner node 602 because the light client owner node need only spend the staked funds to a different address (e.g., an address controlled by itself) to stop the staking process. There is no permission required or request that must be approved by the staking vault 608 operator for the light client owner node to reclaim the delegated stake.

The staking vault 608 can be viewed as playing a role similar to a blockchain smart contract in that there is a manager and an owner who need not be the same. The manager can only stake whereas the owner can spend. Enforcement of this arrangement can be done by a transaction output locking script for the delegated stake that does not send funds directly to the staking vault 608 but rather sends the funds to the locking script that requires the spending transaction to be the staking transaction. In other words, the locking script encumbrance on the transaction made by the light client owner node 602 requires that it pay funds and staking reward only to itself in the coinstake transaction, which is usually the first transaction of a block and is analogous to the coinbase transaction of a proof-of-work system (e.g., bitcoin).

The stake deployer 610 operates by trying to propose a new block that will be accepted by the network according to the consensus rules. In the hybrid proof-of-work/proof-of-stake system, the staking process starts at operation 612, which attempts to guess a time stamp that meets a difficulty target. This process of guessing a timestamp that meets a difficulty target is analogous to miners trying to guess the nonce in a pure proof-of-work system. On some chains, the amount of staked coins serves as a weighting factor that influences the difficulty target such that stakers with greater funds at stake have an easier time guessing a correct timestamp nonce. Thus there is not a single difficulty target shared across all stakers but rather each staker has her own target. Guessing the timestamp is also different from guessing the nonce in that there could be a window during which timestamps would be valid. In other words, the staking vault cannot guess any nonce, but only nonces that are within the window compared to the current time.

When the stake deployer 610 guesses a correct timestamp, the next step is operation 614 wherein the wallet 616 of the staking vault spends the staked funds to itself in the transaction 620 and receives the staked funds back plus the staking reward in the transaction 622. After a successful stake, the staking vault 610 checks at decision block 624 whether the staking funds owner has unilaterally spent the staking funds to reclaim them or whether the staking funds are still in the delegated UTXO. If the owner has reclaimed the stake, the reclaiming transaction will be available for inspection by the staking vault 608 on its copy of the blockchain. and the staking vault ends at 626. If the owner has not reclaimed her stake, then the stake deployer 610 loop returns to operation 612 to try to guess the next timestamp and propose another valid, and thus profitable, block.

When the light client owner wants to reclaim her stake, a button on the light client owner node 602 can be activated to send transaction 628 spending the staked funds to a wallet address controlled solely by the light client owner node 602 to peers 618 on the blockchain network. In this way, the staking vault node 608 does not serve as a single point of failure that could go down and endanger the staker's funds. The staking vault 608 could go completely dark, cease all staking actions, and fail to respond to all inquiries, and the staked funds and staking rewards would still be safe because the owner can unilaterally spend to another address under her control and continue use of the funds in the same way as any funds on a blockchain in terms of spending and receiving through a typical wallet application.

Figure 7:
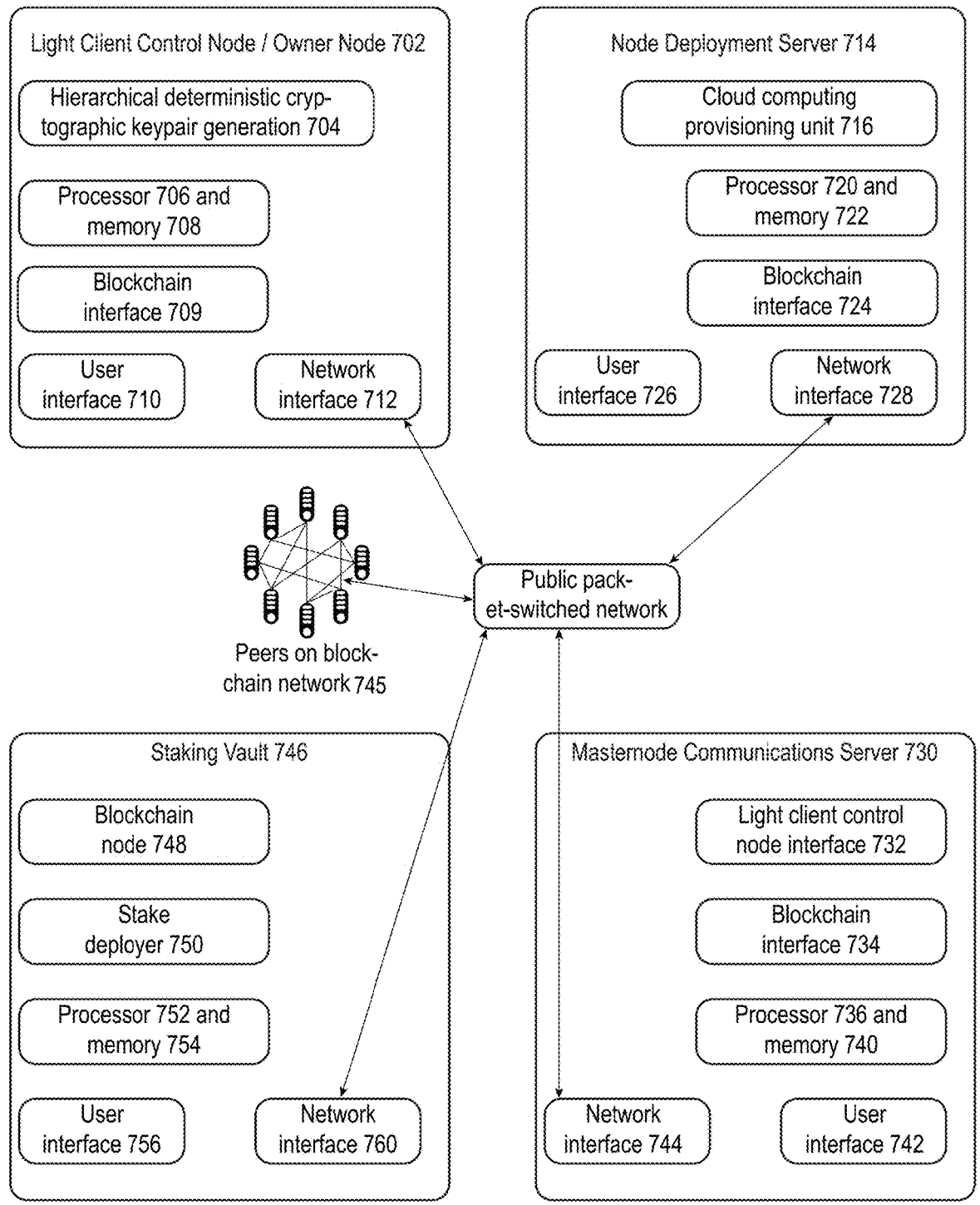
FIG. 7 is a system diagram 700 of components of several of the participants in the system described herein in accordance with some embodiments.

FIG. 7 is a system diagram 700 of components of several of the participants in the system described herein in accordance with some embodiments. One participant is the light client control node for masternode deployment and/or the stake owner node 702 for staking vault operations. Components included therein are the processor 706 and memory 708. Program instructions can reside in the memory 708 and be executed by the processor 706 to carry out the functions described herein including hierarchical deterministic cryptographic keypair generation 704. Network communications with other participants including the peers 745 on the blockchain network are through the network interface 712, which can communicate with the public packet-switched network. The light client 702 has a blockchain interface 709 that need not be a full copy of the blockchain but could be an SPV (Simplified Payment Verification) wallet that only verifies block headers and can manage a wallet. The blockchain interface 709 can include entropy input and key pair generation including key pair generation of different derivation paths to generate sets of keys for more than one purpose (e.g., masternode control key set and wallet key set). The user interface 710 receives commands from the staker/masternode owner and displays information regarding the operations described herein to the same.

Another participant in the system is the node deployment server 714. The node deployment server 714 has the processor 720 and memory 722. Program instructions can reside in the memory 722 and be executed by the processor 720 to carry out the functions described herein. Network communications with other participants including the peers 745 on the blockchain network are through the network interface 728, which can communicate with the public packet-switched network. The blockchain interface 724 can include access to a copy of the blockchain, such as through a block explorer website or API for carrying out the functions described herein. The cloud computing provisioning unit 716 identifies available cloud computing resources such as requesting and obtaining provisioning from a cloud services provider (e.g., Digital Ocean, Amazon AWS, etc.) of sufficient computing resources to install and run the blockchain node components described herein. The user interface 726 can include an API, portal, or other interface for communicating status of the other participants.

Another component is the masternode communications server 730. The masternode communications server 730 has the processor 736 and memory 740. Program instructions can reside in the memory 740 and be executed by the processor 736 to carry out the functions described herein. Network communications with other participants including the peers 745 on the blockchain network are through the network interface 744, which can communicate with the public packet-switched network. Light client control node interface 732 can communicate with the light client to receive the masternode funding transaction, form the masternode activation message, guess the masternode activation message future-dated timestamp for pingless masternode activation, relay errors and status messages to the light client, and other functions described herein. The blockchain interface 734 can include access to a copy of the blockchain, such as through a block explorer website or API for carrying out the functions described herein.

Another component is the staking vault 746. The staking vault 746 has the processor 752 and memory 754. Program instructions can reside in the memory 754 and be executed by the processor 752 to carry out the functions described herein. Network communications with other participants including the peers 745 on the blockchain network are through the network interface 760, which can communicate with the public packet-switched network. A blockchain node 748 can be a full network node maintaining a copy of the blockchain ledger, transactions in the mempool, perform validations of all transactions, check whether the stake has been reclaimed, and share the same with the peers 745. The stake deployer 750 can be used to form the staking transaction, guess the timestamp nonce, and share the same with the peers 746. User interface 756 can communicate with the owner node 702 to receive staking instructions.

Figure 8:
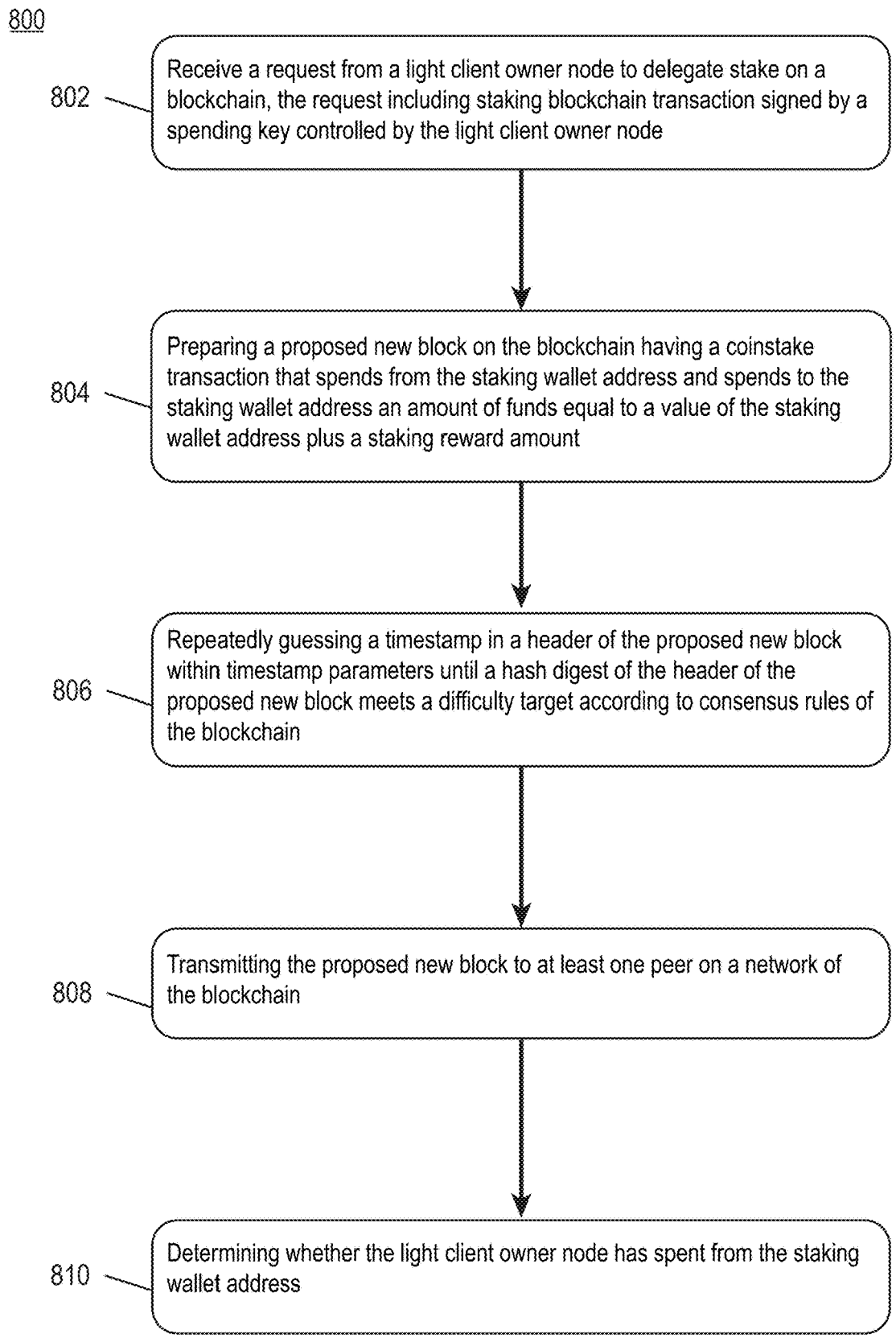
FIG. 8 is a flowchart of an example method of delegated proof-of-staking on a blockchain in accordance with some embodiments.

FIG. 8 is a flowchart of an example method of delegated proof-of-staking on a blockchain in accordance with some embodiments. The method 800 includes operation 802 that receives a request from a light client owner node to delegate stake on a blockchain, the request including staking blockchain transaction signed by a spending key controlled by the light client owner node. The operation 802 includes the light client owner node forming a transaction that is safe from being misused by the staking vault. In implementations, such a transaction is on a blockchain that is of the UTXO model. In a UTXO model, a transaction consumes one or more inputs and creates one or more outputs. Normally, the inputs are from the spending wallet and the outputs include the payee wallet plus a change address, which is needed because UTXOs are atomically spent and cannot be fractionally spent. If the staking vault had the ability to choose the outputs, then the funds could be spent. But if the transaction is encumbered in such a way that the output can only be the same wallet address as the input, then the funds cannot be unilaterally moved by the staking vault. Another way of looking at it is that the staking vault can only satisfy the encumbrance and unlock the staked funds if spending the funds to the same address that already has the funds. The staking transaction proves the funds are really staked by spending the funds to itself.

An operation 804 prepares a proposed new block on the blockchain having a coinstake transaction that spends from the staking wallet address and spends to the staking wallet address an amount of funds equal to a value of the staking wallet address plus a staking reward amount. By coinstake transaction, it is meant a special transaction in a block that, unlike the other transactions in the block, is allowed to spend funds that did not previously exist. The coinstake transaction is analogous to the coinbase transaction in bitcoin that allows the miner of the block to claim the block reward of newly minted coins. Normally, a transaction cannot have an output that exceeds the sum of its inputs. A coinbase or coinstake transaction, on the other hand, can spend any inputs plus an additional amount that represents the reward for mining the block. In bitcoin, the reward is newly minted coins plus the transaction fees paid by the transactions included in the block. In the presently disclosed system, the coinstake transaction output is the value of the input to the coinstake transaction (the staked funds) plus the staking reward of newly minted funds. Transactions fees paid by transaction in the block may be, but need not be, included in the coinstake transaction. The proposed new block includes pending valid transactions in the mempool of the staking vault that can be ordered according to any priority (e.g., oldest first, highest fees, etc.)

An operation 806 repeatedly guesses a timestamp in a header of the proposed new block. Timestamp parameters may restrict the available space of timestamps, such as timestamps that are within a threshold of the current time. For each guessed header, the staking vault hashes the block header with the guessed timestamp and compares the digest of the hash to the network difficulty target. If the difficulty target is met, the block is solved. If the difficulty target is not met, then another timestamp is guessed. An operation 808 transmits the proposed new block to at least one peer on a network of the blockchain for inclusion in the chain. An operation 810 determines whether the light client owner node has spent the staked funds. If not, the staking process repeats until the staked funds have moved.

Figure 9:
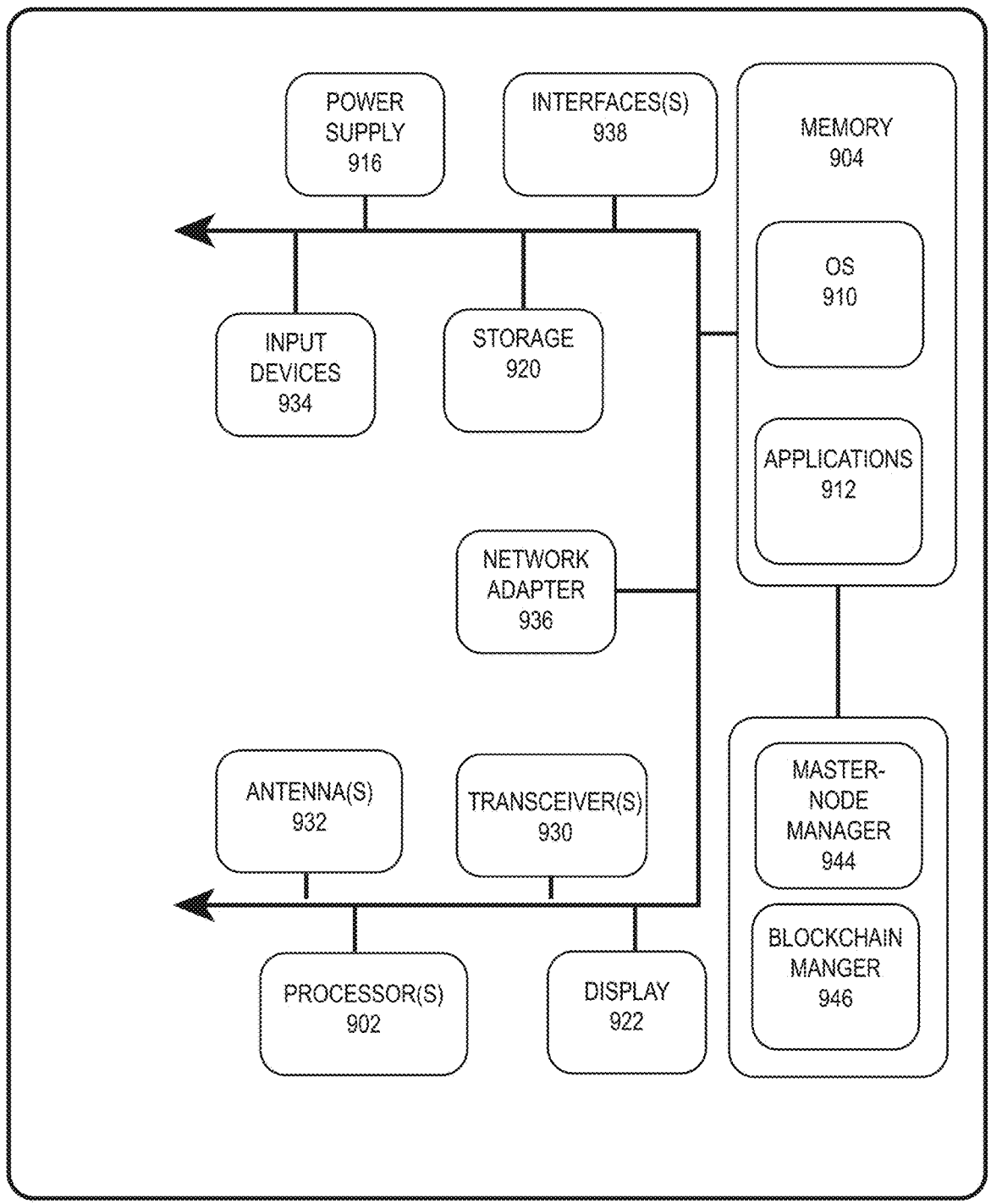
FIG. 9 is an example system that may be useful in implementing the disclosure herein.

FIG. 9 is an example system that may be useful in implementing the disclosure herein. FIG. 9 illustrates an example system (labeled as a processing system 900) that may be useful in implementing the described technology. The processing system 900 may be a client device, such as a smart device, connected device, Internet of Things (IoT) device, laptop, mobile device, desktop, tablet, or a server/cloud device. The processing system 900 includes one or more processor(s) 902, and a memory 904. The memory 904 generally includes both volatile memory (e.g., RAM) and non-volatile memory (e.g., flash memory). An operating system 910 resides in the memory 904 and is executed by the processor 902.

One or more application programs 912 modules or segments, such as masternode manager 944 and blockchain manager 946 are loaded in the memory 904 and/or storage 920 and executed by the processor 902. In some implementations, the masternode manager 944 is stored in read-only memory (ROM) or write once, read many (WORM) memory. Data such as extrinsic event data sources may be stored in the memory 904 or storage 920 and may be retrievable by the processor 902 for use by masternode manager 944 and the blockchain manager 946, etc. The storage 920 may be local to the processing system 900 or may be remote and communicatively connected to the processing system 900 and may include another server. The storage 920 may store resources that are requestable by client devices (not shown). The storage 920 may include secure storage such as one or more platform configuration registers (PCR) managed by one or more trusted platform modules (TPMs), which may be implemented in a chip or by the trusted execution environment (TEE).

The processing system 900 includes a power supply 916, which is powered by one or more batteries or other power sources and which provides power to other components of the processing system 900. The power supply 916 may also be connected to an external power source that overrides or recharges the built-in batteries or other power sources.

The processing system 900 may include one or more communication transceivers 930 which may be connected to one or more antenna(s) 932 to provide network connectivity (e.g., mobile phone network, Wi-Fi®, Bluetooth®, etc.) to one or more other servers and/or client devices (e.g., mobile devices, desktop computers, or laptop computers). The processing system 900 may further include a network adapter 936, which is a type of communication device. The processing system 900 may use the network adapter 936 and any other types of communication devices for establishing connections over a wide-area network (WAN) or local area network (LAN). It should be appreciated that the network connections shown are exemplary and that other communications devices and means for establishing a communications link between the processing system 900 and other devices may be used.

The processing system 900 may include one or more input devices 934 such that a user may enter commands and information (e.g., a keyboard or mouse). Input devices 934 may further include other types of input such as multimodal input, speech input, graffiti input, motion detection, facial recognition, physical fingerprinting, etc. These and other input devices may be coupled to the server by one or more interfaces 938 such as a serial port interface, parallel port, universal serial bus (USB), etc. The processing system 900 may further include a display 922 such as a touch screen display.

The processing system 900 may include a variety of tangible processor-readable storage media and intangible processor-readable communication signals including in virtual and/or cloud computing environment. Tangible processor-readable storage can be embodied by any available media that can be accessed by the processing system 900 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing system 900. In contrast to tangible processor-readable storage media, intangible processor-readable communication signals may embody computer-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of deploying a remotely controlled blockchain masternode, the method comprising:
    receiving a request from a light client control node to deploy a remote masternode, the request including a blockchain transaction identifier and a management private key;
    deploying an image to establish a remote masternode on a remote server, the remote masternode connecting to peers on a network of the blockchain;
    receiving a status from the remote masternode indicating participation in the network of the blockchain;
    receiving a request for a node command from the remote masternode;
    transmitting the node command to the remote masternode; and
    receiving a result of the node command from the remote masternode.

2. The method of claim 1, wherein the remote server is computer hardware selected by a user of the light client control node.

3. The method of claim 1, wherein the node command is received from the light client control node.

4. The method of claim 1, further comprising:
    broadcasting the result of the node command from the remote masternode to an error reporting platform if the result of the node command satisfies an error condition.

5. The method of claim 4, wherein the error reporting platform is a chat channel.

6. The method of claim 1, wherein the request from the light client control node includes a masternode tier and a signed transaction hash encumbering funds on the blockchain is sufficient to support the masternode tier according to the consensus rules of the blockchain, the masternode tier determining a masternode reward rate.

7. A system for registering a newly deployed masternode to a blockchain, the method comprising:
    a processor;
    a computer network interface in communication with at least one peer on a peer-to-peer network of a blockchain; and
    a computer-readable media having instructions which, when executed by the processor, cause the system to:
        receive a request from a light client control node to register a new masternode on the blockchain, the request including identification of a masternode funding transaction;
        transmit, to the light client control node, a request for a masternode activation message signed with a light client control node masternode private cryptographic key and including a future-dated timestamp;
        continuously monitor progress of the blockchain until the funding transaction is confirmed to the blockchain and buried under a sufficient number of blocks to satisfy an activation condition;
        determine whether the future-dated timestamp of the masternode activation message is compatible with consensus rules of the blockchain; and
        broadcast the masternode activation message to at least one peer on the peer-to-peer network of the blockchain if the future-dated timestamp of the masternode activation message is compatible with consensus rules of the blockchain.

8. The system of claim 7, wherein the instructions, when executed by the processor, cause the system to further:
    request, from the light client control node, a digital signature with the masternode private cryptographic key on another masternode activation message having another future-dated timestamp.

9. The system of claim 7, wherein the instructions, when executed by the processor, cause the system to further:
    estimate a value of the future-dated timestamp based on one of the following: average blockchain transaction fee, mempool size, and size of timestamp window according to the consensus rules of the blockchain.

10. The system of claim 8, wherein the another future-dated timestamp is a current timestamp.

11. A system for delegated proof-of-staking on a blockchain, the method comprising:
    a processor;
    a computer network interface in communication with at least one peer on a peer-to-peer network of a blockchain; and
    a computer-readable media storing a set of cryptographic keypairs, each keypair including a public key and a spending key, and storing instructions which, when executed by the processor, cause the system to:
        (a) receive a request from a light client owner node to delegate stake on a blockchain, the request including a staking blockchain transaction signed by a spending key controlled by the light client owner node, the staking blockchain transaction consuming an unspent transaction output having a staking wallet address with an encumbrance that only allows the processor to spend to the same staking wallet address with one spending key of the set of cryptographic keypairs;

(b) prepare a proposed new block on the blockchain having a coinstake transaction that spends from the staking wallet address and spends to the staking wallet address an amount of funds equal to a value of the staking wallet address plus a staking reward amount;

(c) repeatedly guess a timestamp in a header of the proposed new block within timestamp parameters until a hash digest of the header of the proposed new block meets a difficulty target according to consensus rules of the blockchain;

(d) transmit the proposed new block to at least one peer on a network of the blockchain;

(e) determine whether the light client owner node has spent from the staking wallet address; and repeat (b) through (e) if the light client owner node has not spent from the staking wallet address.

12. The method of claim 11, wherein the difficulty target depends on an amount of funds in the staking wallet address.

13. The method of claim 11, wherein the encumbrance allows the processor to spend to the same staking wallet address and a whitelisted wallet address with the one spending key of the set of cryptographic keypairs.

14. The method of claim 11, wherein the light client owner node is configured to present a button to an owner to reclaim the delegated stake.

15. The method of claim 14, wherein, when activated, the button causes the light client owner node to form a blockchain transaction spending funds in the staking wallet address to a wallet address of the light client owner node.

* * * * *